US006806615B2

United States Patent
Enomoto et al.

(10) Patent No.: US 6,806,615 B2
(45) Date of Patent: Oct. 19, 2004

(54) CORE, ROTATING MACHINE USING THE CORE AND PRODUCTION METHOD THEREOF

(75) Inventors: Yuuji Enomoto, Hitachi (JP); Masashi Kitamura, Mito (JP); Toshimi Abukawa, Hitachiota (JP); Yuji Takagai, Kiryu (JP)

(73) Assignees: Hitachi, Ltd., Tokyo (JP); Japan Servo Co., Ltd., Tokyo (JP)

( * ) Notice: Subject to any disclaimer, the term of this patent is extended or adjusted under 35 U.S.C. 154(b) by 96 days.

(21) Appl. No.: 10/107,312

(22) Filed: Mar. 28, 2002

(65) Prior Publication Data

US 2003/0030345 A1 Feb. 13, 2003

(30) Foreign Application Priority Data

Aug. 7, 2001 (JP) .......................... 2001-239142

(51) Int. Cl.$^7$ ............................. H02K 1/00; H02K 1/06; H02K 1/18; H02K 1/28
(52) U.S. Cl. ...................... 310/218; 310/216; 310/217
(58) Field of Search ................ 310/254, 46, 156.01, 310/216, 217, 194, 218, 156

(56) References Cited

U.S. PATENT DOCUMENTS

| | | | | | |
|---|---|---|---|---|---|
| 3,740,600 | A | * | 6/1973 | Turley ........................ | 310/194 |
| 3,914,859 | A | * | 10/1975 | Pierson ........................ | 29/596 |
| 4,134,054 | A | * | 1/1979 | Akamatsu .................... | 310/112 |
| 4,670,696 | A | * | 6/1987 | Byrne et al. ................. | 310/168 |
| 5,053,666 | A | * | 10/1991 | Kliman et al. ............... | 310/218 |
| 5,146,127 | A | * | 9/1992 | Smith .......................... | 310/166 |
| 5,276,958 | A | * | 1/1994 | Larsen ......................... | 29/596 |
| 5,481,147 | A | * | 1/1996 | Kaplan et al. ............... | 310/112 |
| 5,545,938 | A | * | 8/1996 | Mecrow ................ | 310/156.64 |
| 5,719,456 | A | * | 2/1998 | Kolomeitsev ............... | 310/112 |
| 5,744,894 | A | * | 4/1998 | Cho et al. .............. | 310/156.05 |
| 5,773,908 | A | * | 6/1998 | Stephens et al. ....... | 310/156.47 |
| 5,877,574 | A | * | 3/1999 | Molnar .................. | 310/156.05 |
| 6,160,334 | A | * | 12/2000 | Teshima et al. .......... | 310/67 R |
| 6,191,510 | B1 | * | 2/2001 | Landin et al. ............... | 310/254 |
| 6,202,286 | B1 | * | 3/2001 | Schustek et al. ............. | 29/596 |
| 6,218,760 | B1 | * | 4/2001 | Sakuragi et al. ............. | 310/254 |
| 6,226,856 | B1 | * | 5/2001 | Kazama et al. ............... | 29/596 |
| 6,262,508 | B1 | * | 7/2001 | Shibayama et al. ......... | 310/152 |

(List continued on next page.)

FOREIGN PATENT DOCUMENTS

| | | | | |
|---|---|---|---|---|
| JP | 10-94230 | | 4/1998 | |
| JP | 10218064 | * | 7/1998 | ............ H02K/1/18 |
| JP | 11-252844 | | 9/1999 | |
| JP | 2000069694 | * | 3/2000 | ............ H02K/1/18 |
| JP | 2000-152528 | | 5/2000 | |
| JP | 2001099108 | * | 3/2001 | .......... H02K/15/18 |
| JP | 200379080 | * | 3/2003 | ............ H02K/1/18 |

*Primary Examiner*—Dang Le
*Assistant Examiner*—Heba Elkassabgi
(74) *Attorney, Agent, or Firm*—Crowell & Moring LLP

(57) ABSTRACT

A core has an annular inner core portion, a rib-shaped core portion extending radially from the annular inner core portion and an outer peripheral core portion. Magnetic pole tooth portions are formed in an annular shape on the outer periphery of the rib-shaped core portion, and the core is composed of a plurality of core blocks having the same shapes as blocks formed by dividing the core in circumferential direction. Each of the plurality of core blocks has a concave/convex engage portion at an inner peripheral portion corresponding to the inner periphery of the annular inner core portion, and the plurality of core blocks gathered so as to form the core are fastened each other by a cylindrical housing having an outer surface formed in concave/convex shape, inserted in the inner peripheral portion so as to engage with each other at the concave/convex engage portions, and changed in diameter relative to the core blocks due to thermal shrinkage or expansion of the cylindrical housing, so that the core blocks are tightly fitted to each other without any gap between adjacent core blocks.

9 Claims, 5 Drawing Sheets

U.S. PATENT DOCUMENTS

| | | | |
|---|---|---|---|
| 6,304,018 B1 * | 10/2001 | Ham et al. | 310/216 |
| 6,356,005 B1 * | 3/2002 | Hsu | 310/254 |
| 6,359,355 B1 * | 3/2002 | Hartsfield et al. | 310/254 |
| 6,369,480 B1 * | 4/2002 | Nishiyama et al. | 310/156.38 |
| 6,448,685 B1 * | 9/2002 | Mayer et al. | 310/254 |
| 6,515,396 B1 * | 2/2003 | Fritzsche | 310/216 |
| 6,515,397 B1 * | 2/2003 | Schmid | 310/217 |
| 6,573,632 B2 * | 6/2003 | Hsu | 310/216 |
| 2002/0101126 A1 * | 8/2002 | Crapo et al. | 310/156.01 |
| 2002/0140312 A1 * | 10/2002 | Ikeda et al. | 310/217 |
| 2003/0098628 A1 * | 5/2003 | Enomoto et al. | 310/218 |
| 2003/0127933 A1 * | 7/2003 | Enomoto et al. | 310/194 |
| 2003/0155834 A1 * | 8/2003 | Enomoto et al. | 310/218 |

\* cited by examiner

FIG. 6(a-1)
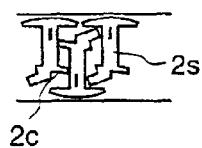
FIG. 6(b-1)
FIG. 6(c-1)
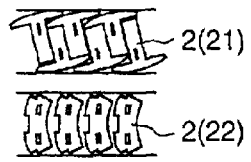
FIG. 6(a-2)
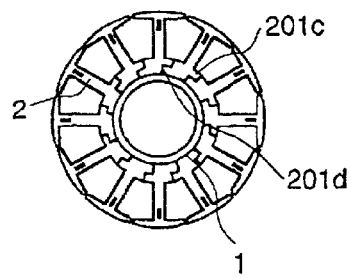
FIG. 6(b-2)
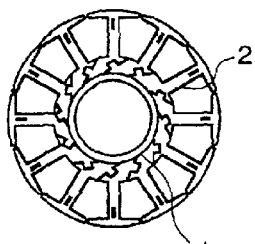
FIG. 6(c-2)
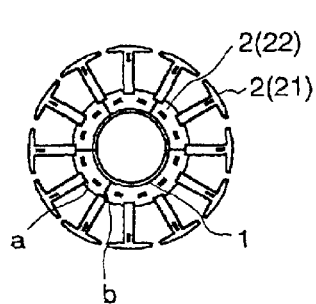
FIG. 7a
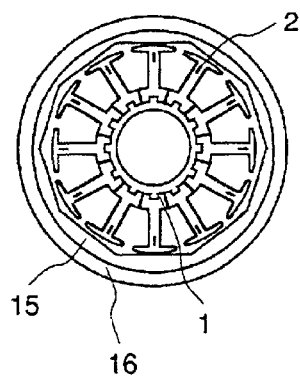
FIG. 7b
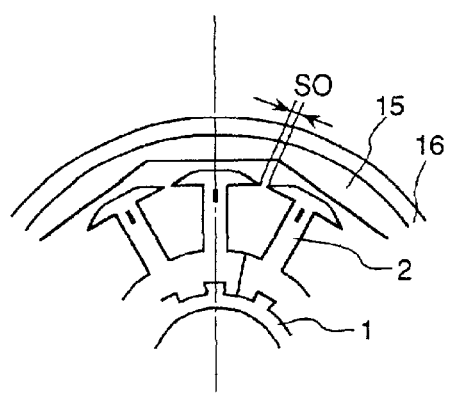

CORE, ROTATING MACHINE USING THE CORE AND PRODUCTION METHOD THEREOF

BACKGROUND OF THE INVENTION

The present invention relates to a core, a rotating electric machine using the core and used for driving a fun, disc, or the like, and a production method of the core.

DESCRIPTION OF PRIOR ARTS

The current of arts relating to a stator structure of inner rotation type motor is that in order to improve an occupation ratio of winding to an area, a core is divided each pole and the divided cores are fastened each other by laser beam welding, or press-fitted and shrinkage-fitted in a cylindrical housing positioned at the periphery of the core.

On the other hand, in a stator of an outer rotation type motor, magnetic tooth portions (teeth) are formed in an annular shape at the outer periphery of rib-shaped core portion extending in a radial direction from an inner core portion formed in an annular shape and a magnetic gap between the stator and a magnetic rotor is formed at the outer peripheral portion of the core, so that it is difficult to fasten core portions to each other at the outer peripheral portion of the core and it is impossible to effect press fit and shrinkage fit of a member such as a cylindrical housing from the peripheral portion of the core.

Here, consideration is given to a case where a core division production method which is taken for conventional inner rotation type motors is applied for outer rotation type motors. That is, considering the shrinkage fit in reverse, it is considered that a housing is arranged at an inner peripheral portion of a core and gives stress to the core side. This means expansion fit, that is, the housing which is chilled by such means as liquid nitrogen to be lower than a room temperature is arranged at an inner peripheral portion of the core, and the housing expands when the temperature returns to the room temperature and gives stress to the core. However, even if the stress is give outwardly to peripherally divided cores, the divided cores only expand in a radial direction and can not be fastened each other.

For such reasons, it was difficult for outer rotation type motor stators and winding type direct current motor rotors to employ a core division production method of dividing a core and assembling the divided cores to form the complete core.

Prior arts relating to a structure that a stator core of outer rotation type motor is divided are disclosed in JP A 10-94230 and JP A 11-252844, for instance. In the stator construction according to the prior arts, a stator core is divided into a yoke portion and teeth portions, both of which have dove tail structures, and the divided cores are assembled each other by fitting the dove tail structures each other. In each of the core division production methods according to the prior arts, fastening of the yoke portion and teeth portions is done only by press fit, so that the fastened core is weak in mechanical strength as a product. Therefore, considering that teeth tips receive reaction force of torque when the core is used as a motor, the methods can not be used for motors of large torque.

Further, JP A 7-203644 discloses a similar prior art to the above prior arts. This prior art does not relate to a stator in which a winding is wound, but relates to a rotor construction of inner rotation type, which is composed of magnetic pieces having a dovetail shape for holding a magnetic disposed inside the rotor and a support portion of non-magnetic material. In the construction, also, the core components are fastened to be a core by simple press fit and any adherent is not used, which is disclosed in the document. The construction can not be applied to a motor of high rotation and high torque because centrifugal force is applied to the magnet.

Still further, another conventional method using connection core is disclosed in JP A 2000-152528. In this method, core pieces which were punched in a linear shape with tips of teeth thereof connected finely to each other, are subjected to winding and then assembled in a circular core shape after completion of the winding. Finally it is necessary to fix one portion of an end portion by any means. In this example, a method of fixing it by using continuous pins is disclosed, it also can be fixed by welding or the like. However, in this method, since magnetic materials are connected between magnetic poles, magnetic flux s leak between the magnetic poles, and the efficiency of the motor is remarkably reduced. Further, since the width of the connecting portion can not be made sufficiently wide for a mechanical reason, mechanical strength lacks and it is not sufficient for a high torque motor.

SUMMARY OF THE INVENTION

An object of the present invention is to provide, in an electric rotating machine having a core which has an annular inner core portion, a rib-shaped core portion extending radially form the annular inner core portion and an outer peripheral core portion that magnetic pole tooth portions are formed in an annular shape on the outer periphery of the rib-shaped core portion, a core which is formed by assembling core blocks, for example, each divided each pole for raising an occupation ratio of winding per an area, which core has mechanical strength equivalent to that of a core made of segments each of which is punched out in a complete core shape.

The above-mentioned object is achieved by a core which has an annular inner core portion, a rib-shaped core portion extending radially form the annular inner core portion and an outer peripheral core portion that magnetic pole tooth portions are formed in an annular shape on the outer periphery of the rib-shaped core portion, wherein the core is composed of a plurality of core blocks having the same shapes as blocks formed by dividing the core in circumferential direction, the plurality of core blocks each having a concave/convex engage portion at an inner peripheral portion corresponding to the inner periphery of the annular inner core portion, and the plurality of core blocks gathered so as to form the core are fastened each other by a cylindrical housing having an outer surface formed in concave/convex shape, inserted in the inner peripheral portion so as to engage with each other at the concave/convex engage portions, and changed in diameter relative to the core blocks due to thermal shrinkage or expansion of the cylindrical housing, whereby the core blocks are tightly fitted to each other without any gap between adjacent core blocks.

BRIEF DESCRIPTION OF THE DRAWINGS

FIGS. 6(a-1), 6(a-2), 6(b-1), 6(b-2), 6(c-1) and 6(c2) are other embodiments, in each of which stator core blocks of a outer rotation type motor are fastened each other by a cylindrical housing;

FIGS. 7a and 7b are views for explanation of prevention of demagnetization that becomes a bar for an outer rotation type motor mounting thereon a stator core formed by core blocks;

DESCRIPTION OF EMBODIMENTS OF THE INVENTION

Figure 1:
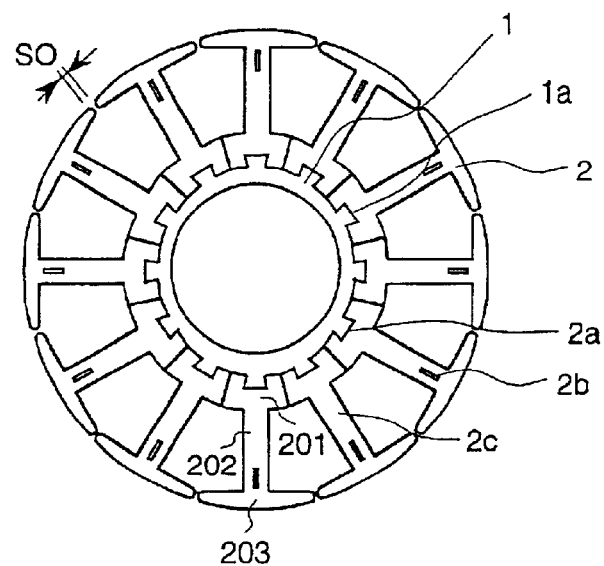
FIG. 1 is a plan view of a basic construction of an outer rotation type motor stator of an embodiment of the present invention.

An embodiment of the invention will be described hereunder in detail, referring to FIGS. 1 to 5b. *FIG. 1 shows a basic construction of an outer rotation type motor stator core of an embodiment of the present invention.*

As shown in FIG. 1, a stator core 2 has an annular inner core portion 201 which is ring-shaped, a rib-shaped core portion 202 extending from the inner core portion 201 in a radial direction and an outer peripheral portion 203. Magnetic pole tooth portions are formed in an annular shape at the outer periphery of the rib-shaped core portion 202. The stator core of the present embodiment is divided into plural core blocks or core pieces 2c in a circumferential direction. The stator core pieces 2c each have a concave engage or fitting portion 2a which has a dovetail groove at an inner periphery side thereof, and a cylindrical housing 1 disposed in an inner periphery of each core piece 2c has an engage portion 1a which is shaped convex or in dovetail and can be fitted in the concave fitting portion 2a of the core 2.

Figure 2A:
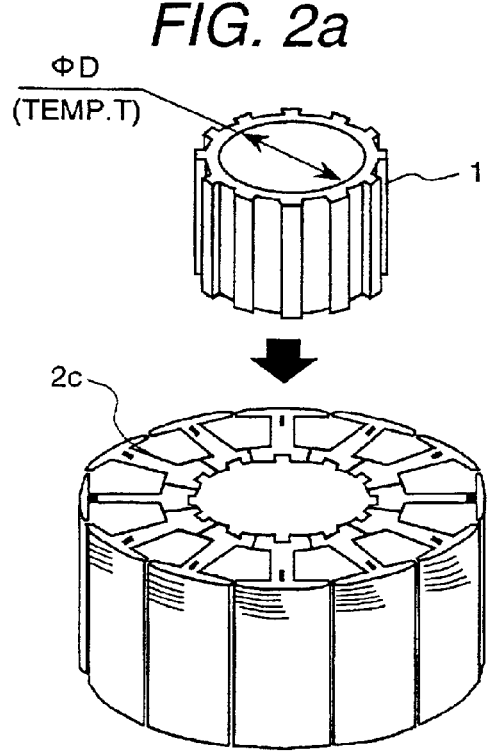
FIG. 2a is a perspective view of the stator of the present embodiment for explaining assemblage of a stator core of the outer rotation type motor and a cylindrical housing.
Figure 2B:
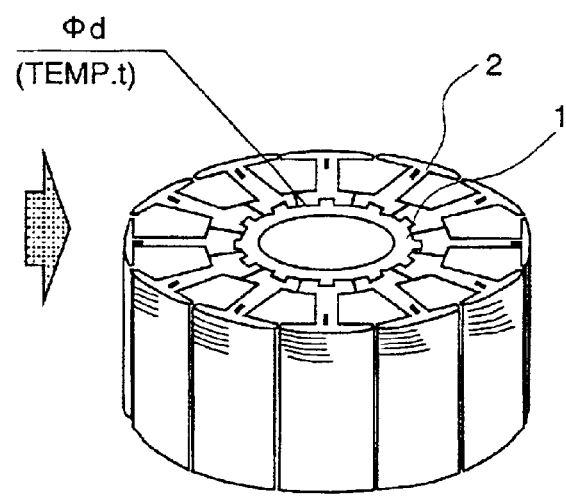
FIG. 2b is a perspective view of assembled stator core and cylindrical housing in the present embodiment.

FIGS. 2a and 2b show an assembling process of the stator core pieces 2c and the cylindrical housing 1.

The cylindrical housing 1 is to be fitted in the stator core pieces 2c gathered to be a complete core shape by shrinkage fit. The cylindrical housing 1 is raised in temperature by means of a heating furnace before fitting, and then shrinkage-fitted in the stator core pieces 2c under the condition that the temperature of the housing is kept higher than that of the stator core pieces 2c, whereby the stator core 2 that the core pieces 2c are fastened each other by the cylindrical housing 1 is completed as shown in FIG. 2b.

In this embodiment, the cylindrical housing 1 is made of aluminum that has a high expansion coefficient. As a material of the cylindrical housing 1, desirable is the material which has a larger linear expansion coefficient than iron that is a material for the core 2. Aluminum alloy, zinc alloy, cupper ally magnesium, and so on, for example, are suitable for the material of the cylindrical housing 1. However, the material is not limited thereto. Resin also can be used as long as the above-mentioned condition is satisfied.

As for the diameter of the cylindrical housing 1 at time of the shrinkage fit, letting the inner diameter of the cylindrical housing 1 when the temperature is raised to a temperature of T° C. be D, and the linear expansion coefficient of the cylindrical housing material be α ($31 \times 10^{-6}$(1/° C.) in the case of aluminum), the inner diameter d of the cylindrical housing 1 when the temperature is returned to a room temperature t° C. after shrinkage fit, is as follows:

$$D > d \tag{1}$$

The temperature condition at this time is as follows:

$$T > t \tag{2}$$

The diameter at a room temperature before shrinkage fit is $D/\{\alpha(T-t)\}$, and there is the following relation:

$$D/\{\alpha(T-t)\} < d < D \tag{3}$$

That is, the cylindrical housing 1 after shrinkage fit shrinks in an inner peripheral direction, keeps on being given such stress that the cylindrical housing 1 will return to the original size, so that it has an effect that the core pieces 2c are pulled inward. It is possible to fasten the core pieces 2c each other by this effect.

Next, an assembling process of the stator core pieces 2 will be explained, referring to FIGS. 3a to 3g.

Figure 3A:
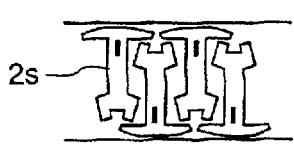
FIGS. 3a to 3g are views for explanation of core segments forming and assembling process of the outer rotation type motor stator in the present embodiment.
Figure 3B:
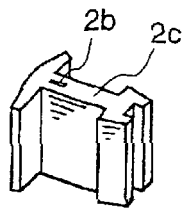

First, as shown in FIG. 3a, core segments each having a divided core shape are punched out from a stator core material such as silicon steel plate and, as shown in FIG. 3b, the core segments 2s are laminated to form a core piece 2c. As this lamination method, generally, there are methods, one of which uses caulking (at a part of symbol 2b in FIG. 2b), another laminates the core segments 2s by joining core segment end portions thereof by means of welding such as leaser beam welding, and so on. It is possible to produce a stator core at higher yield rate by punching out the core segments in divided core shape than punching out the core segments each in a whole or complete core shape. In the motor of the present embodiment, the yield rate is about 30% when core segments are punched in whole core shape while it is about 60% when punched in divided core shape, which is about twice.

Figure 3C:
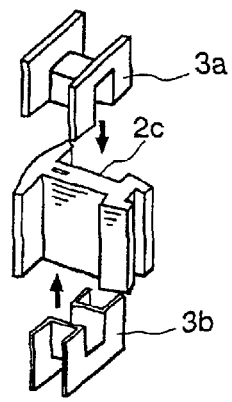

Next, in order to secure insulation between windings and the core 2, insulating bobbins 3a, 3b having shapes as shown in FIG. 3c are mounted on each of the core pieces 2c. As the insulating bobbins 3a, 3b, generally resin is used, and nylon, PBT, PET, PPS, LCP, and so on also are used. It also is possible to wind a tape-shape insulating paper on the core pieces 2c or cut the insulation paper to stick it on the core pieces 2c. Further, it is possible to provide the insulation by core-insert formation of resin or by coating epoxy resin on the core pieces 2c.

Figure 3D:
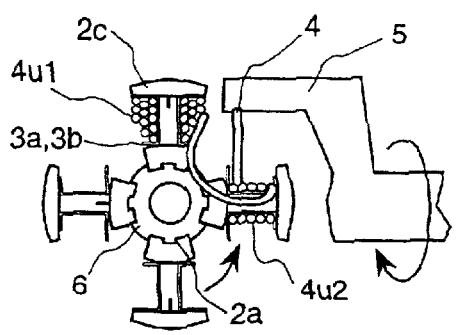
Figure 3E:
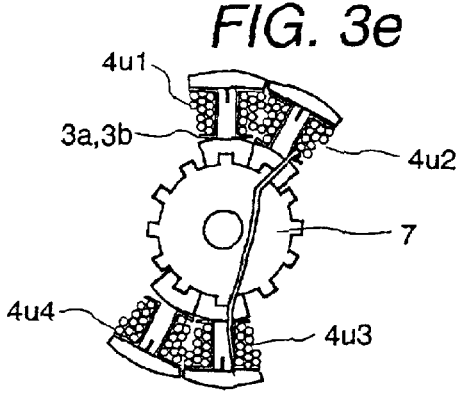
Figure 3F:
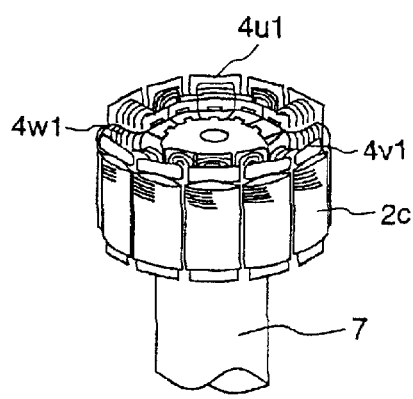
Figure 3G:
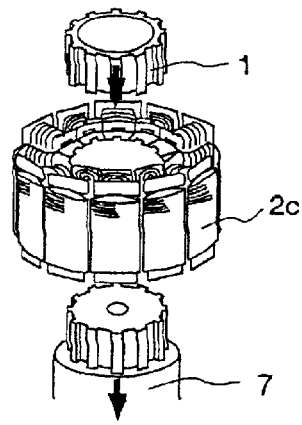

By dividing the core 2 in core pieces 2c, the portions of core pieces 2c on which windings are put become outside, so that it becomes possible to freely elect and provide the above-mentioned insulating means. The insulated core pieces 2c are set on a winding machine as shown in FIG. 3d to put windings thereon. In this example, by using the fitting portions 2a of the core pieces 2c (refer to FIG. 1) to be fitted with the cylindrical housing 1 (refer to FIG. 1), the core pieces 2c are set on a core holding portion 6 of the winding machine in a cruciform shape, lined-up winding is being put while taking widely the working space of a flier arm 5 of the winding machine. Thereby, it becomes possible to pack electric lines for a coil 4 in a slot of the core 2 at a high occupation ratio of winding per a slot area. The coils 4u1, 4u2, 4u3 and 4u4 each that a winding is put on the core piece 2c are set on a assembling jig 7 as shown in FIG. 3e. In the case where windings of three phases are put on a 12-slot motor, 4 coils are used for each phase. The coils are arranged so as to cope with the pole number and set on the assembling jig 7. In FIG. 3e, an arrangement of the coils in a case of a 10-pole motor is shown, however, it can be applied to motors of another pole number such as an 8-pole motor according to an arrangement method. In this case, also, as in the same manner as in the case of holding in the winding machine, the core pieces 2c are held by the assembling jig 7 by using the fitting portion 2a of the core 2 (refer to FIG. 1) to be fitted with the cylindrical housing 1 (in FIG. 1). FIG. 3f shows the condition that coils 4u1, 4v1, 4w1 for three phases are held by the assembling jig 7. The cylindrical housing 1 is inserted as shown in FIG. 3g under such a condition that the coils are held, and the assembling jig 7 is taken off at the same time as the cylindrical housing 1 is inserted, whereby the stator core pieces 2c are assembled to be stator core 2.

Figure 4A:
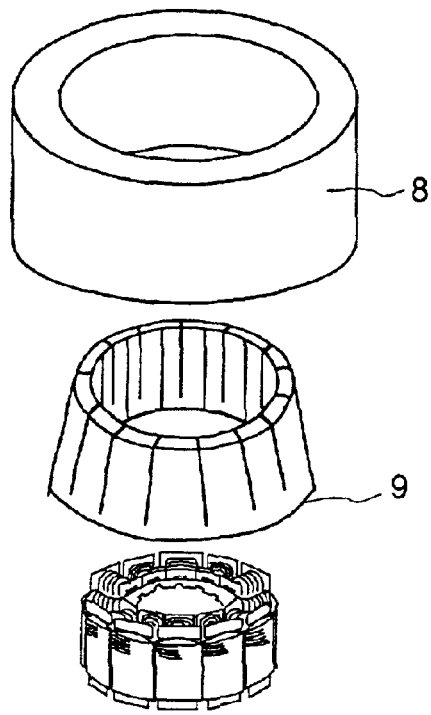
FIG. 4(a) is perspective views of divided stator cores and housing of an outer rotation type motor, which are to be assembled, for improving precision of an outer diameter of the stator.
Figure 4B:
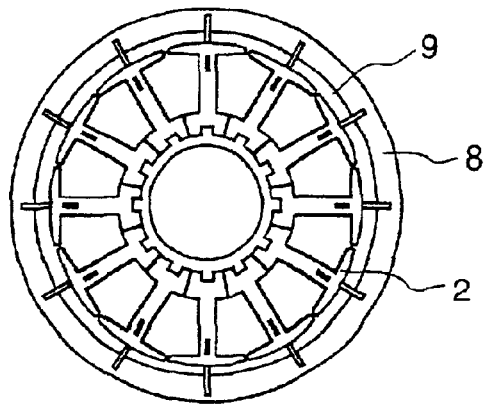
FIG. 4(b) is a plan view of a stator assembled as in FIG. 4(a)

The cylindrical housing 1 shrinks uniformly over the whole periphery when the core pieces 2c are assembled, whereby assemblage precision of the stator core 2 is improved. A method of assembling the stator core pieces 2c while keeping the assemblage precision of the stator core pieces 2c is shown in FIGS. 4a and 4b. When the cylindrical housing 1 is shrinkage-fitted, the outer peripheral portion of the stator core pieces 2c is restrained by a tapered collet chuck 9. The outer periphery of the collect chuck is inserted in a collet chuck holder 8, the inside of which has a taper of the same angle as that of the collet chuck 9, and restrained in a radial direction when the cylindrical housing 1 is shrunken. Stress is applied uniformly in an inner peripheral direction by inserting the collet chuck 9 into the collet chuck holder 8 to press the core pieces 2c, whereby the core pieces 2c shrink uniformly at the same time as the cylindrical housing 1 shrinks. Thereby, the assemblage of the core pieces 2c can be completed to be a core 2 with high precision of the circularity, size, and so on.

Figure 5A:
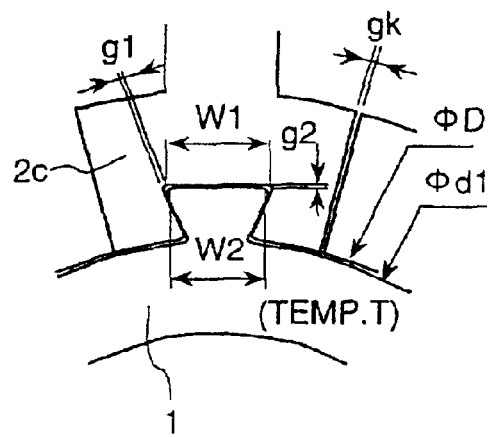
FIGS. 5(a) and (b) are views for explaining dimensional relations, before and after shrinkage fit, of the divided stator core and a housing of the outer rotating type motor in the present embodiment.
Figure 5B:
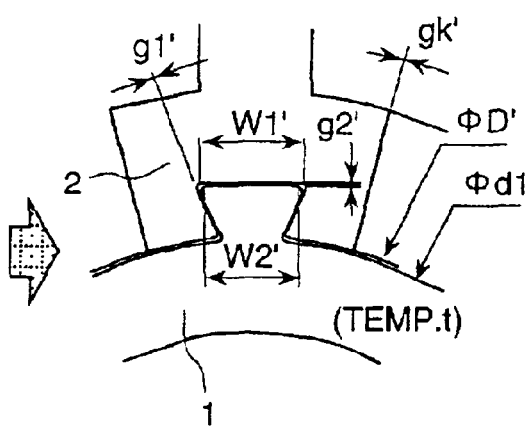

Dimensional relations before and after the shrinkage fit of the core pieces 2c and the cylindrical housing 1 are shown in FIGS. 5a and 5b. In the dimensional relation, gaps g1 and g2 for assembling the core pieces 2c are provided between the fitting portions 1a and 2a under the condition that the cylindrical housing 1 is expanded by heat before the shrinkage fit. That is, under the condition that the cylindrical housing 1 is expanded, there are provided such dimensional relations that the width of a convex portion of each fitting portion of the cylindrical housing 1 is smaller than the width of a concave portion of each fitting portion 2a of the core piece 2c, the height of the convex portion of the fitting portion 1a is smaller than that of the concave portion of the fitting portion 2a of the core piece 2c, and the outer diameter of the cylindrical housing 1 is smaller than the inner diameter of the core 2. Thereby, gaps necessary for assembling are secured when the shrinkage fit is conducted, and assembling work is improved. While keeping the dimensional relations, and keeping such a relation that the gaps for assembling become x cos θ or less where an angle of a dovetail-shape fitting portion is θ and a shrinkage amount of the cylindrical housing 1 after shrinkage fit is x, the core pieces 2c are strongly fastened each other. At this time, a mechanical gap gk between adjacent core pieces 2c becomes zero, so that they are also connected magnetically and characteristics as a motor can be expected to improve.

FIGS. 6(a-1) to 6(c-2) are views for explaining other embodiments of the invention.

A cylindrical housing 1 is expansion-fitted in an inner side of assembled core pieces 2c to cause the cylindrical housing 1 to apply outer peripheral stress to the core pieces 2c. FIGS. 6(a-1), 6(b-1) and 6(c-1) are for explaining punching of core material to produce core segments 2s each have a divided core shape, and FIGS. 6(a-2), 6(b-2) and 6(c-2) each show a state that core pieces 2c, each of which is formed by laminating the core segments 2s as previously mentioned, are fastened by the cylindrical housing 1.

In FIGS. 6 (a-1) and 6(a-2), each segment 2s for forming the core piece 2c has a shape as formed by dividing the core in the peripheral direction, and the core pieces 2c, each of which is formed by laminating the core segments 2s, also have a shape as formed by dividing the core in the peripheral direction. The core pieces 2c each have a holding portion 201c on one side and an inserting portion 201d on the opposite side to the holding portion 201c. The holding portion 201c engages with the inserting portion 201d of the adjacent core piece 2c to prevent the core piece 2c from moving away radially outside when the cylindrical housing 1 inside the core pieces 2c expands. Further, the core pieces 2c are fastened strongly by each other by reaction force between the adjacent core pieces 2c.

In FIGS. 6(b-1) and 6(b-2), adjacent core pieces 2c are provisionally engaged with each other at fitting portions to be assembled by press fit, and then the cylindrical housing 1 is expansion-fitted in the provisionally assembled core pieces 2c. Thereby, gaps between the core pieces 2c are made zero by expansion of the cylindrical housing 1 in an outer peripheral direction.

In FIGS. 6(c-1) and 6(c-2), a core is divided a yoke portion and a tooth portion. The yoke portion is divided 6 yoke pieces 22 and the tooth portion is 12 tooth pieces 21. Segments forming each yoke piece 22 are laminated like a brick-laminated state by deviating the positions by 60 degrees in a peripheral direction each layer or every plural layers in the lamination direction. The tooth pieces 21 are axially inserted in the yoke pieces 22, whereby the fitting portions of the tooth portions 21 have a construction that press fit portions (a) and sandwiched portions (b) appear repeatedly in an axial direction. The cylindrical housing 1 is expansion-fitted in an inner portion of the complicatedly engaged core pieces 21, 22, whereby the sandwiched portions (b) are complicatedly engaged and fastened without leaving any gap.

In this manner, according to the embodiment, in a electric rotating machine provided with the core which has an inner core portion formed annularly, a rib-shaped core portion radially extending from the inner core portion and an outer core portion in which tooth portions are formed annularly on the outer periphery of the rib-shaped core portion, the freedom of the core shape becomes large, the slot opening can be made thin irrespective of the diameter of electric wires for windings, and an occupation rate of winding per area can be improved. Further, since the occupation rate of winding per area can be improved, coil resistance can be reduced, and the heat conductive ratio between electric wires also improves, so that temperature characteristic also improves. Thereby, it is possible to do limit design of the motor, make the size small and make the efficiency high.

Further, with the above-mentioned construction, since magnetic fluxes generated through the windings is improved, magnetic saturation occurs at teeth tips and demagnetization occurs by a rotor magnet. However, it is possible to solve such problems because of large design freedom of the core shape. FIGS. 7a and 7b show examples of two measures for the problems. As for occurrence of the magnetic saturation at tooth tips, the shape of a tip portion of each tooth is formed by chamfering both sides of the tooth or by cutting such as rounding under the condition that slot openings SO each are kept minimum or zero. Further, demagnetization which occurs at both sides of the tooth can be reduced by forming the rotor magnet in a polygonal shape, and it is possible to obtain sufficient torque by improvement of the occupation rate of winding per area and the core shape.

Figure 8A:
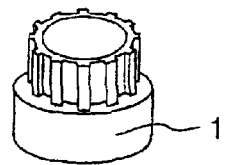
FIGS. 8a to 8c are views showing shapes of housing and manufacturing process.
Figure 8B:
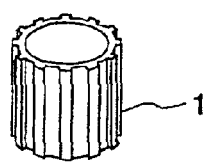
Figure 8C:
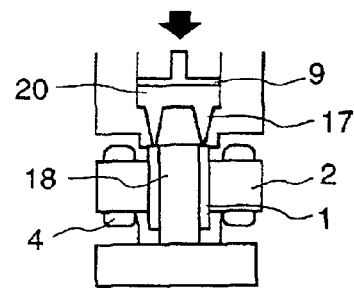

FIGS. 8a, 8b and 8c are views for explaining the shape production process of the cylindrical housing 1. Since the cylindrical housing 1 has a complicated shape, the size precision is required in some degree. The material is desirable to be metal alloy of high thermal expansion and resin, as previously mentioned. In a case of the shape shown in FIG. 8a, a method of forming the cylindrical housing 1 by machining can be taken. The housing 1 of high precision can be obtained by machining. Further a method of forming the housing by die-casting can be considered. The method by die-casting makes it possible to form an axial stopper portion at the same time as formation of the other portion, so that the method is one of very effective forming methods.

In the case of a cylindrical housing having the same cross-sectional shape in an axial direction as shown in FIG. 8b, the housing can be formed by wire-electric discharge machining. A production method by the wire-electric discharge machining has characteristics such that automatic machining (unmanned machining) by numerical control is possible and the precision is high. Further, the construction as shown in FIG. 8b makes it possible to effect extrusion or drawing when a soft material such as aluminum is used, and a cylindrical housing, the surface of which is highly smooth, can be produced at a low cost.

FIG. 8c shows a method of directly mounting a cylindrical housing 1 into a stator core 2. The stator core 2 is set on a die, and a plunger 17 injecting a material of the housing is arranged over an inner-diameter restricting die 18 and a die for restraining the surrounding of the die 18. On an upper portion of the plunger 17, a cylinder 20 for pressing out a housing material and a piston 19 are arranged, whereby the housing material is extruded or injected into the stator core 2 in the die. At this time, the housing material which has a high temperature and is melted is directly contacted with the core 2, so that inward stress is generated when the housing material temperature lowers and core pieces are fastened strongly. Thereby, there is no mechanical gas between adjacent core pieces. As material of the housing 1, aluminum, zinc and magnesium can be taken, and resin also can used for outsert-forming.

Figure 9:
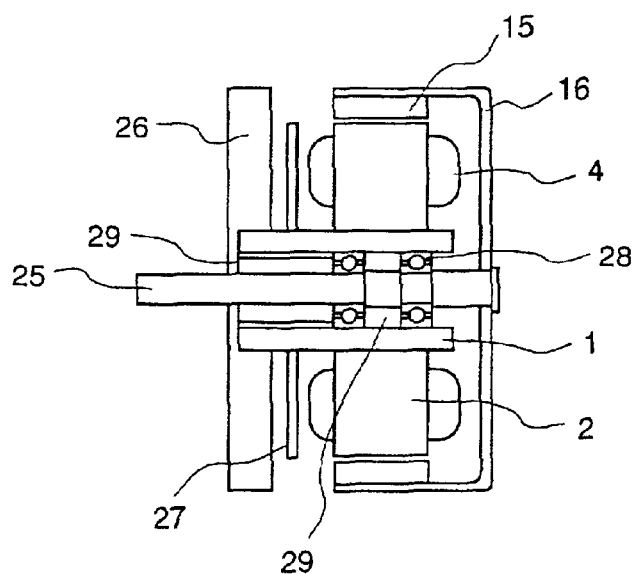
FIG. 9 is a sectional view of a motor in which the stator core is assembled.

A whole construction of an example of an electric rotating machine such as a motor having the above-mentioned stator core is explained, referring to FIG. 9. In FIG. 9, a motor shaft 25 is arranged in the inner peripheral portion of the cylindrical housing 1 shrinkage-fitted in the core 2 through a bearing 28. At one end of the motor shaft 25, a cup-shaped rotor core 16 is fixed thereto. A rotor magnet 15 is arranged inside the rotor 16 so as to face the stator core 2 and fixed to the rotor with fixing means such as adhesion. The cylindrical housing 1 is fixed to a motor base 26 by means of press-fit, screws, shrinkage fit or the like. Between the motor base 26 and the stator core 2, a control board 27 is arranged. Colors 29 are arranged for axially fixing the bearing 28.

In FIG. 9, the case where the present invention is applied to an outer rotation type motor stator is shown, however, the present invention can be applied to a rotor of winding type DC motor, and a generator, other than the above-mentioned stator.

According to the present invention, in an electric rotating machine provided with a core having an inner core portion formed in a ring shape, a rib-shaped core portion extending radially from the inner core portion and an outer peripheral core portion in which tooth portions are formed annularly in the outer periphery of the rib-shaped core portion, it is possible to provide the core with the same mechanical strength as a core formed of segments each punched out in a complete core shape and bear high torque even if the core is formed by dividing in core pieces each pole and assembling them into the core in order to raise an occupation rate of winding per area.

What is claimed is:

1. A stator core comprising an annular inner core portion, a rib-shaped core portion extending radially from said annular inner core portion, and an outer peripheral core portion, magnetic pole tooth portions being formed in an annular shape on the outer periphery of said rib-shaped core portion, wherein
    said stator core is composed of a plurality of core pieces having the same shapes as pieces formed by dividing said stator core in a circumferential direction, each of said plurality of core pieces having a concave/convex engage portion at an inner peripheral portion corresponding to an inner periphery of said annular inner core portion, and said plurality of core pieces composing said stator core are fastened to each other by a cylindrical housing having an outer surface formed in concave/convex shape, inserted in said inner peripheral portion so as to engage with the core pieces at said concave/convex engage portions, and changed in diameter relative to said core pieces due to thermal shrinkage or expansion of said cylindrical housing, whereby said core pieces are tightly fitted to each other without any gap between adjacent core pieces.

2. The stator core according to claim 1, wherein said core pieces are fastened to each other by shrinkage fit of said cylindrical housing.

3. The stator core according to claim 1, wherein said core pieces are fastened to each other by expansion fit of said cylindrical housing.

4. The stator core according to claim 1, 2 or 3, wherein a slot opening which is a gap between magnetic poles is smaller than a diameter of an electric wire to be wound in a slot.

5. The stator core according to claim 1, 2 or 3, wherein the stator core is a stator core of an outer rotation type motor, both ends of the stator core are cut, and a rotor shape is made polygonal so that each magnetic pole is made flat.

6. An electric rotating machine comprising a stator and a rotor, wherein said stator has a stator core having an annular inner core portion, a rib-shaped core portion extending radially from said annular inner core portion, and an outer peripheral core portion, magnetic pole tooth portions being formed in an annular shape on the outer periphery of said rib-shaped core portion, said stator core is composed of a plurality of core pieces having the same shapes as pieces formed by dividing said stator core in a circumferential direction, each of said plurality of core pieces having a concave/convex engage portion at an inner peripheral portion corresponding to an inner periphery of said annular inner core portion, and said plurality of core pieces are fastened to each other by a cylindrical housing having an outer surface formed in a concave/convex engage portion and inserted in said inner peripheral portion so as to engage with the core pieces at said concave/convex engage portions, said plurality of core pieces being fastened tightly to each other by shrinkage or expansion fit of said cylindrical housing.

7. A stator core comprising an annular inner core portion, a rib-shaped core portion extending radially from said annular inner core portion, and an outer peripheral core portion, magnetic pole tooth portions being formed in an annular shape on the outer periphery of said rib-shaped core portion, wherein said stator core is composed of a plurality of core pieces having the same shapes as pieces formed by dividing said stator core in a circumferential direction, each of said plurality of core pieces having a concave/convex engage portion at an inner peripheral portion corresponding to an inner periphery of said annular inner core portion, and said plurality of core pieces composing said stator core are tightly fitted to each other at circumferential ends thereof by a cylindrical housing having an outer surface formed in concave/convex shape, and inserted in said inner peripheral portion so as to engage with said plurality of core pieces at said concave/convex engage portions to radially urge said core pieces by a change in diameter relative to said core pieces due to thermal shrinkage of said cylindrical housing.

8. A stator core according to claim 1 or 7, wherein said concave/convex engage portion of each of said plurality of core pieces is a dovetail groove, said outer surface of said cylindrical housing being formed in dovetails, and said dovetails are inserted in said dovetail grooves of said core pieces, respectively, whereby said plurality of core pieces are radially urged by said cylindrical housing through engagement portions of said dovetails and dovetail groove.

9. A stator core according to claim 7 wherein a linear expansion coefficient of said cylindrical housing is larger than said plurality of core pieces.

* * * * *